May 25, 1948.  D. G. RUSS  2,441,977
METHOD AND APPARATUS FOR METERING FUEL TO
SUPERCHARGED INTERNAL-COMBUSTION ENGINES
Filed April 20, 1945  2 Sheets-Sheet 1

INVENTOR.
Daniel G. Russ
BY
ATTORNEY.

May 25, 1948. D. G. RUSS 2,441,977
METHOD AND APPARATUS FOR METERING FUEL TO
SUPERCHARGED INTERNAL-COMBUSTION ENGINES
Filed April 20, 1945 2 Sheets-Sheet 2

INVENTOR.
Daniel G. Russ
BY
Ralph L Chappell
ATTORNEY.

Patented May 25, 1948

2,441,977

UNITED STATES PATENT OFFICE 2,441,977

METHOD AND APPARATUS FOR METERING FUEL TO SUPERCHARGED INTERNAL-COMBUSTION ENGINES

Daniel G. Russ, Erlton, N. J.

Application April 20, 1945, Serial No. 589,439
18 Claims. (Cl. 123—119)

(Granted under the act of March 3, 1883, as amended April 30, 1928; 370 O. G. 757)

This invention relates to new and useful improvements in internal combustion engine carburetion, and more particularly to the carburetion of supercharged aircraft engines wherein the supercharger impeller or rotor is utilized as an air flow meter to control the amount of fuel that is supplied to the engine.

Prior to the present invention the amount of fuel that is mixed with the air and supplied to an aircraft or other internal combustion engine has been controlled by a conventional carburetor device in accordance with the entering pressure and temperature of the air and the pressure drop across the venturi, thereby requiring frequent compensatory adjustments of the carburetor for changes in altitude and temperature. Also, the metering force of present day carburetors is a parabolic function of the air flow therethrough, as distinguished from a straight line function, and they are also characterized by definite fuel pressure operating limits that present objectionable fuel and allied vapor elimination problems. Furthermore existing carburetors have been found to be quite sensitive to changes in air scoop or intake design, and the pressure loss in their air induction system decreases the critical altitude of efficient engine operation.

Bearing in mind the foregoing, the present invention involves essentially the discovery that the mass flow of air supplied to a supercharged internal combustion engine is proportional to the ratio of a predetermined dynamic pressure differential at the supercharger impeller discharge region to the speed of rotation of the supercharger impeller, and that these values can be measured and translated effectively to meter the fuel fed to the engine, thereby eliminating the necessity for an independent carburetor with its attendant limitations and objectionable characteristics.

Metering of the fuel in this manner according to the ratio of a predetermined dynamic pressure differential to the speed of rotation of the supercharger impeller, provides a fuel metering system that supplies more nearly to the optimum fuel flow desired over the entire operating range of the engine. This is so for the reason that the metering force of such a system has been found to vary as a straight line with air flow, and, not only are no compensations or adjustments of the system required for changes in altitude and temperature, but the system operates at substantially higher pressures than existing carburetors with the result that the overall accuracy of the system is increased.

Such a fuel metering system is characterized also by its greater simplicity and lightness in weight, and the fact that it is substantially less sensitive to changes in the plane air scoop or intake design than are present carburetor devices. Furthermore, the system is subject to less pressure loss in the air induction system with the result that the critical flight altitude for efficient engine operation is increased, and the system may be adapted to aircraft engines of different size merely by changing the metering orifice and nozzle in the fuel channel thereby simplifying and standardizing the design and construction of the equipment.

Accordingly, therefor, the principal object of the present invention is to provide a novel method for metering the flow of fuel to a supercharged internal combustion engine in a desired relation to the ratio of a predetermined dynamic pressure differential at the discharge region of the supercharger impeller to the speed of rotation of the supercharger impeller.

Another object of the present invention is to provide novel apparatus that is operable to meter the flow of fuel in a desired relation with respect to air flow in accordance with the ratio of a predetermined impeller discharge dynamic pressure differential to the speed of rotation of the supercharger impeller.

Another object of the invention is to provide a novel method and apparatus as set forth which requires no compensation or adjustments for changes in altitude or temperature.

A further object of the invention is to provide a novel fuel metering method and apparatus having the stated characteristics that is substantially insensitive to changes in air intake scoop design, and which is characterized by a minimum pressure loss in the air induction system thus reducing icing tendencies and increasing the critical altitude ceiling for efficient engine operation.

Still a further object of the invention is to provide novel fuel metering apparatus of the stated character that is comparatively light in weight, of relatively simplified construction, and useable interchangeably with different sizes of engines upon changing the metering orifice and nozzle in the fuel channel.

These and other objects of the invention, and the various features and details of the construction, use and operation thereof, are hereinafter fully set forth and described with reference to the accompanying drawings, in which.

Figures 1, 2, 3:
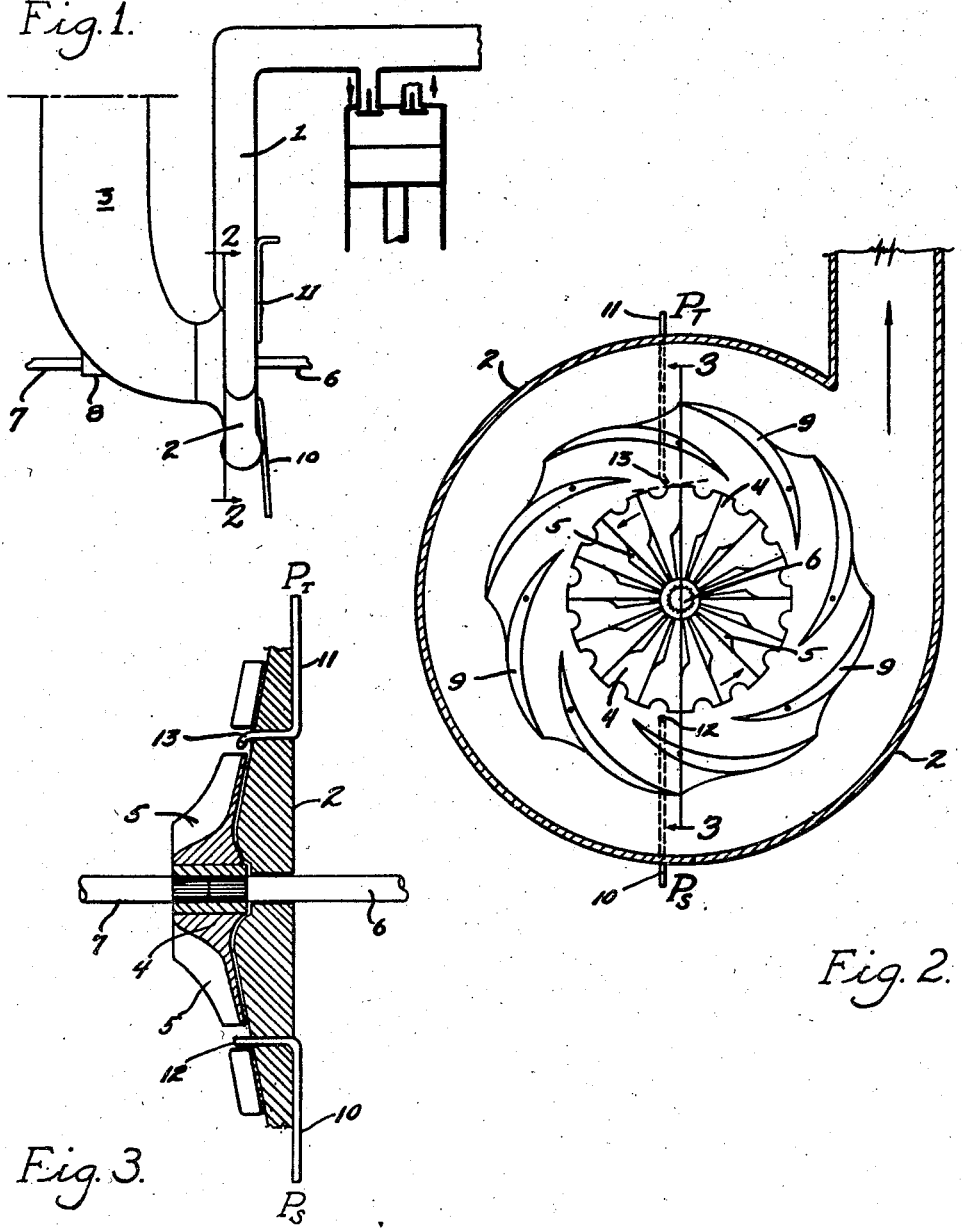
Fig. 1 is a fragmentary view in elevation of the air intake, supercharger and manifold of an internal combustion engine.
Fig. 2 is an enlarged sectional view taken on line 2—2, Fig. 1.
Fig. 3 is a sectional view taken on line 3—3, Fig. 2.

Referring now to the drawings, and more particularly to Figs. 1, 2 and 3 thereof, reference numeral 1 designates the intake manifold of an internal combustion engine for aircraft. The inlet to the manifold 1 is connected to the discharge of a conventional main engine supercharger 2 to the intake of which is connected an air-fuel intake duct 3. The supercharger 2 comprises the usual rotary impeller 4 having vanes 5, that is driven by a shaft 6 from a suitable source of rotational power, and driven by the impeller 4 at the speed of rotation thereof or directly proportional thereto, and extending in a direction opposite to the drive shaft 6 and outwardly through a journal 8 in the intake duct 3, is a shaft 7 from which a suitable speed responsive control mechanism of fuel metering apparatus may be driven at the speed of rotation of the impeller 4. Surrounding the supercharger impeller 4 circumferentially thereof is a diffuser comprising a plurality of fixed arcuate vanes 9.

In accordance with the present invention the flow of fuel to the internal combustion engine is metered in a selected relation to the ratio of a predetermined dynamic pressure differential at the supercharger impeller discharge region to the speed of rotation at the supercharger impeller 4 and, in addition to providing the impeller speed take-off shaft 7 as described, it is necessary also to provide the supercharger 2 with suitable pressure take-off taps for the selected total pressure and the static pressure in the supercharger impeller discharge region.

As shown in Figs. 2 and 3 of the drawings, this may be accomplished effectively by positioning in the supercharger 2, at approximately diametrically opposite points therein and substantially perpendicular to the plane of rotation of the impeller 4 between the periphery of the latter and the diffuser, the open ends of a pair of tubes 10 and 11, respectively. The tube 10 essentially has its end opening disposed substantially parallel to the plane of rotation of the impeller 4, as indicated at 12, thereby receiving the static pressure existing in the discharge region of the impeller and transmitting it to suitable pressure responsive control mechanisms of the metering apparatus.

On the other hand, the tube 11 is arranged so that its end portion is positioned in the supercharger impeller discharge region so that it is inclined toward the rim of the impeller 4 at a predetermined angle to the tangent at that point on the impeller rim so that the end opening faces generally against or into the radial discharge from the impeller 4, as indicated at 13. The precise angle of disposition of the end portion of said tube 11 is such that end opening thereof receives for transmission to suitable pressure responsive control mechanism of the fuel metering apparatus, a pressure that is the geometric means between the resultant and radial components of the total pressure existing in the impeller discharge region of the supercharger.

Such an arrangement as this of a single total pressure tap-off tube 11 has been found satisfactory in the case of single-speed internal combustion aircraft engines, and for certain aircraft engines of the two-speed type. However, in certain makes of two-speed type aircraft engines there may exist a sufficient difference between the geometric mean between the resultant and radial components of the total pressure at low-speed and the geometric mean between these same components of the total pressure at high-speed as to require either separate total pressure take-off tubes for low and high speeds or a single tube provided with suitable mechanism for changing the position angle thereof with respect to the impeller to properly position the tube for low-speed operation and for high-speed operation.

As the installation, in such cases, of two total pressure take-off tubes, or of a dual-purpose single tube, as described, is well within the skill of the engine mechanic, the details of construction and arrangement thereof need not be described, and the invention will be entirely clear from the following description with reference to a supercharger having a single total pressure take-off tube 11 fixedly disposed with respect to the impeller 4 to receive a pressure that is the geometric mean between the resultant and radial components of the total pressure at the impeller discharge region of a supercharger which is associated, for example, with a single-speed aircraft engine.

Figure 4:
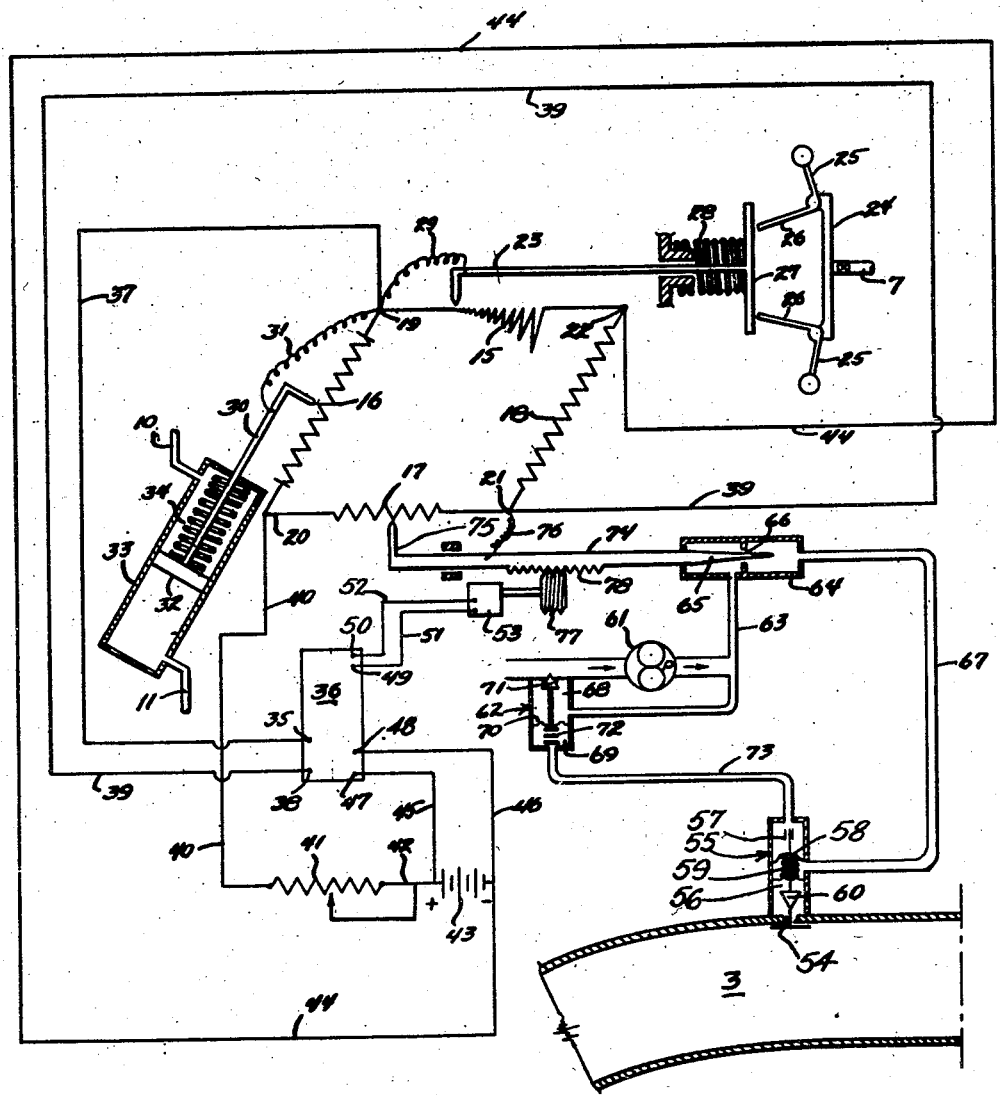
Fig. 4 is a diagrammatic illustration of one embodiment of apparatus operable to meter the flow of fuel in accordance with the present invention.

As previously stated, and according to the present invention, the supercharger static and total pressures existing in the tubes 10 and 11, respectively, and the speed of rotation of the supercharger as taken, for example, from the shaft 7, can be correlated and translated to control effectively the flow of fuel to an internal combustion engine with which the supercharger 2 is associated, and in Fig. 4 of the drawings, there is shown one example of suitable control apparatus for this purpose that is of the electrically operated type comprising essentially a Wheatstone bridge circuit together with associated mechanisms operable to meter the flow of fuel to the engine in accordance with the ratio of this dynamic pressure differential to the speed of rotation of the supercharger impeller 4.

Referring to said Fig. 4, a plurality of variable resistances 15, 16 and 17 and a fixed resistance 18 are provided and electrically connected with respect to one another to form a Wheatstone bridge circuit including a terminal connection 19 between resistances 15 and 16, a terminal connection 20 between resistances 16 and 17, a terminal connection 21 between resistances 17 and 18, and a terminal connection 22 between the resistances 18 and 15. As shown, the resistance 15 is of the electro-cam type as distinguished from the resistances 16, 17 and 18.

Associated with the resistance 15 is a slide contact member 23 that is arranged to be positioned or moved lengthwise of the resistance 15 in response to the speed of rotation of the supercharger impeller 4. This may be accomplished, for example, by means of a governor type mechanism comprising a cross-piece 24 that is rotationally driven at the supercharger speed by the previously described shaft 7, the said cross-piece 24 having pivoted thereto weighted arms 25 movable outwardly due to the centrifugal effect of the impeller speed and including elements 26 operable to effect actuation of the slide contact 23 along the resistance 15 through a crosshead 27 against the force of a spring or the like 28. The slide contact 23 is electrically connected to the terminal 19 by a flexible conductor 29.

Similarly associated with the resistance 16 is a slide contact 30 that is electrically connected by a flexible conductor 31 to the terminal 19 and arranged for movement lengthwise of said resistance in response to variations in the supercharger dynamic pressure differential previously described. This may be accomplished, for example, by means of a piston 32 to which said contact 30 is connected as shown, the piston 32 operating within a cylinder 33 into which lead the supercharger total and static pressure lines 10 and 11, respectively. The piston 32 is biased by a spring 34 in a direction tending to return the slide contact member 30 in the zero pressure differential position at the lower end of the resistance 16 with reference to Fig. 4 of the drawings. In operation of the apparatus, the action of the spring 34 is augmented by the supercharger static pressure admitted to the cylinder 33 by pipe 10, and these forces are opposed by the supercharger total pressure admitted to the cylinder 33 at the opposite side of the piston 32 by the pipe 11.

The terminal 19 of the bridge circuit is connected to one input terminal 35 of a converter-amplifier device 36 by means of a conductor 37, and the terminal 21 is connected to the other input terminal thereof by means of a conductor 38. In addition, the bridge circuit terminal 20 is connected by means of a conductor 40 to one terminal of a variable resistance 41 which has its other terminal connected by a conductor 42 to the positive terminal of a suitable source of electrical potential such as, for example, a battery 43, and the bridge terminal 22 is connected by a conductor 44 to the negative terminal of the battery 43, said battery serving as a source of electrical potential for the bridge circuit described. The electrical potential of the battery 43 is applied also to the amplifier tube filaments in the converter-amplifier device 36 by means of conductors 45 and 46 that lead from the terminals of the battery 43 to the terminals 47 and 48, respectively, of said device 36. The output terminals 49 and 50 of the converter-amplifier device are connected respectively by conductors 51 and 52 to the terminals of a reversing electric motor 53 that is operable, as hereinafter described, to regulate the flow of fuel to the internal combustion intake duct 3 as hereinafter described.

Fuel is injected into the engine intake duct 3 through an orifice or nozzle 54 that may be controlled by a valve mechanism 55, comprising chambers 56 and 57, respectively, separated by a flexible diaphragm 58 that is biased by a spring 59 acting thereon in the direction of the chamber 57, the diaphragm 58 serving to actuate a valve element 60 relative to the nozzle 54. The fuel is supplied to this valve 55 from a fuel supply tank (not shown) by means of a conventional fuel pump 61 provided with the usual pressure relief valve 62, fuel being discharged by the pump 61 through a pipe 63 to a needle valve 64, having a needle element 65 cooperable with a flow orifice 66. From the valve 64 the fuel flows through a pipe 67 to the chamber 56 of valve 55 and thence through nozzle 54 into the intake duct 3. The relief valve 62 is constructed similar to the valve 55, and comprises two chambers 68 and 69 separated by a flexible diaphragm 70 that actuates the valve element 71, the diaphragm 70 in this instance, however being biased by a spring 72 toward closed valve position. The chamber 57 of the nozzle valve is subjected to the relief valve vent pressure by means of a pipe 73 that is connected between the relief valve chamber 69 and the nozzle valve chamber 57.

The needle element 65 of the valve 64 may comprise one end portion of an elongated bar-like member 74 the other end of which may be constructed to function as a slide contact 75 in cooperation with the resistance element 17 previously described, the said slide contact 75 being electrically connected to the bridge circuit terminal 21 by means of a flexible conductor 76. Actuation of the bar 74 to effect movement of the slide contact 75 lengthwise of the resistance 17, and of the needle element 65 with respect to the orifice 66 of the valve 64, may be accomplished by the reversing motor 53 driving a worm 77 that is meshed with teeth 78 provided upon said bar 74 intermediate the needle element and slide portions thereof, the motor 53 operating to actuate bar 74 in the appropriate direction to meter the flow of fuel through needle valve 64 to the intake duct 3 in accordance with the ratio of the aforementioned supercharger dynamic pressure differential to the speed of rotation of the supercharger impeller as hereinafter described.

Operation of the apparatus follows generally the principle of the Wheatstone bridge and the electrical circuit thereof is arranged so that the voltage in the two arms of the bridge containing the variable resistance 17 and fixed resistance 18 tends to remain balanced with the voltage in the other two arms of the bridge containing the variable resistances 16 and 15, and hence the net voltage output across the bridge normally is zero. Thus, in the event of any change in the ratio of the supercharger impeller dynamic pressure differential to the speed of rotation of the impeller, causing the value of either or both resistances 16 and 15 to change with a resulting change in voltage, the bridge will become unbalanced electrically so that the voltage across the resistances 16 and 15 is either greater or less than that across the resistances 17 and 18. This voltage differential, being direct current, is converted to alternating current and amplified by the device 36 sufficiently to drive the motor 53 and worm 77 in the appropriate direction thereby actuating the bar 74 to change the value of the resistance 17 in an amount required to electrically rebalance the bridge. Simultaneously, actuation of bar 74 adjusts the needle 65 relative to its orifice 66 to change the rate of fuel flow therethrough to the intake duct 3 in accordance with the change in value of resistance 17 necessary to electrically rebalance the bridge.

A decrease in the voltage across resistances 16 and 15 as compared with the voltage across resistances 17 and 18, caused by a decrease in the ratio of the supercharger dynamic pressure differential to the speed of the supercharger impeller 4, will operate to drive the motor 53 and worm 77 in a direction to actuate bar 74 to the right with respect to Fig. 4 thereby increasing the value of resistance 17 to reduce the voltage in that side of the bridge and rebalance the circuit while at the same time reducing the area of the orifice 66 to reduce the flow of fuel therethrough. On the other hand, an increase in the voltage through the resistances 16 and 15 above that in resistances 17 and 18 causes the motor 53 and worm 77 to be driven in the reverse direction thereby actuating the bar 74 to the left with respect to Fig. 4 to decrease the value of resistance 17 thereby increasing the voltage to rebalance the bridge and simultaneously increase the flow area of orifice 66 to increase the fuel flow therethrough according to the ratio of the supercharger dynamic pressure differential in the impeller discharge region to the speed of rotation of the supercharger impeller.

Since the method and apparatus of the present invention utilize the differential between total and static pressures in the impeller discharge region as one factor of the ratio in proportion to which fuel flow is metered, changes in the intake air temperature and pressure become immaterial, and the frequent adjustments to compensate for changes in the pressure and temperature of the air, such as are required in the case of conventional type carburetors, are entirely eliminated.

Too, since the pressure differential employed is that existing between the total and static pressures in the supercharger discharge region wherein exist the highest pressures in the entire air-fuel supply system, the carburetion system of the present invention will operate efficiently at higher pressures than conventional type carburetors thereby minimizing the percentage error in the system due to friction losses.

Furthermore, since the pressure taps 10 and 11 are located at the supercharger impeller discharge region, any obstruction or stratification of the intake aid will have been dissipated or eliminated after passage of the air through the supercharger 2 with no resulting affect upon the total and static pressures transmitted by the tubes 10 and 11 to the associated control apparatus. Accordingly the present system is much less sensitive to changes in air scoop design than are conventional type carburetion systems wherein the carburetor generally is positioned in the intake scoop and air induction is controlled by the pressure differential across the venturi, with the result that any change in air scoop design effecting a variation the obstruction or stratification characteristics of the intake air, will affect the operation of the carburetor.

In addition, the present system is characterized by a substantially lower pressure loss in the air induction system than are systems employing conventional type carburetors. This is so for the reason that the venturi of conventional carburetors produces a pressure loss in the intake air whereas no venturi or other pressure dissipator is present in the system of this invention, and this characteristic of minimum pressure loss in the air induction of the present system also effectively lessens any tendency for the air to ice, and thereby permits efficient operation of the engine at greater altitudes.

From the foregoing it will be observed that the present invention provides a novel method and apparatus for metering fuel flow according to the ratio of the differential between total and static pressures in the impeller discharge region to the speed of rotation of the supercharger impeller, that eliminates the necessity for a conventional type carburetor with its attendant limitations and objectionable characteristics. The invention provides also a fuel carburetion system for supercharged internal combustion aircraft engines that is characterized by its simplicity and lightness in weight, and which is entirely automatic, foolproof and efficient in operation.

While certain particular embodiments of the present invention have been illustrated and described herein, it is not intended that the invention be limited to this disclosure, and it is contemplated that changes and modifications therein and thereto may be made within the scope of the claims.

The invention described herein may be manufactured and used by or for the Government of the United States of America for governmental purposes without the payment of any royalties thereon or therefor.

I claim:

1. The method of metering fuel flow to a supercharged internal combustion engine which comprises controlling the flow of fuel to said engine in accordance with the ratio of the differential between a predetermined total pressure and the static pressures in the supercharger discharge region to the speed of rotation of the supercharger.

2. In the method of metering fuel flow to an internal combustion engine having a supercharger provided with a rotary impeller, the steps which comprise determining the differential between a predetermined supercharger total pressure and the static pressure in the impeller discharge region of the supercharger, correlating said pressure differential and the speed of rotation of the supercharger impeller, and controlling fuel flow to the engine in accordance with the ratio of said pressure differential to the speed of rotation of said impeller.

3. In the method of metering fuel flow to an internal combustion engine having a supercharger provided with a rotary impeller, the steps which comprise tapping-off a predetermined total pressure and the static pressure in the supercharger impeller discharge region, correlating said total and static pressures to obtain the differential therebetween, determining the speed of rotation of the supercharger impeller, correlating the differential between the total and static pressures and the speed of rotation of the supercharger, and controlling fuel flow to the engine in accordance with the ratio of said pressure differential to the speed of rotation of the impeller.

4. In apparatus for metering fuel to an internal combustion engine having associated therewith a supercharger provided with a rotationally driven impeller, means to tap-off from the supercharger a predetermined total pressure and static pressure generated in the impeller discharge region thereof, means associated with said engine arranged to be driven directly proportional to the speed of rotation of said impeller, and control mechanism responsive to changes in said total and static pressures and in the speed of rotation of the impeller operable to control fuel flow to the engine in accordance with the ratio of the differential between said total and static pressures to the said engine driven means.

5. In apparatus for metering fuel flow to an internal combustion engine having associated therewith a supercharger provided with a rotationally driven impeller, a first control means responsive to changes in the speed of rotation of said supercharger impeller, a second control means responsive to changes in the differential between a predetermined supercharger total pressure and the static pressure in the discharge region of the impeller, and mechanism responsive to said first and second control means operable to meter the flow of fuel to the engine in accordance with the ratio of the differential between said total and static pressures to the speed of rotation of the impeller.

6. In apparatus for metering fuel flow to an internal combustion engine having associated therewith a supercharger provided with a rotationally driven impeller, means to tap-off from the impeller discharge region of the supercharger a predetermined total pressure and the static pressure therein, speed take-off means associated with said engine and arranged to be driven directly proportional to the speed of rotation of the impeller, a first control means responsive to changes in the speed of rotation of said supercharger impeller, a second control means responsive to changes in the differential between said total and static pressures in the discharge region of the impeller, and mechanism responsive to said first and second control means operable to meter the flow of fuel to the engine in accordance with the ratio of the differential between said total and static pressures to the speed of said take-off.

7. In apparatus for metering the flow of fuel to an internal combustion engine having associated therewith a supercharger provided with a rotationally driven impeller, a first control means actuable in direct proportion to the differential between a predetermined supercharger total pressure and the static pressure in the supercharger impeller discharge region, a second control means actuable in direct proportion to the speed of rotation of said impeller, and mechanism controlled by actuation of said first and second control means operable to meter fuel flow to the engine in accordance with the ratio of the differential between said total and static pressures to the speed of rotation of the impeller.

8. In apparatus for metering the flow of fuel to an internal combustion engine having associated therewith a supercharger provided with a rotationally driven impeller, means to tap-off from the impeller discharge region of the supercharger a predetermined total pressure and the static pressure therein, a first control means actuable in direct proportion to the differential between said total and static pressures, speed take-off means associated with said engine arranged to be driven directly proportional to the speed of rotation of the impeller, a second control means actuable in direct proportion to the speed of rotation of said impeller, and mechanism controlled by actuation of said first and second control means operable to meter fuel flow to the engine in accordance with the ratio of the differential between said total and static pressures to the speed of rotation of said take-off means.

9. In apparatus for metering the flow of fuel to an internal combustion engine having associated therewith a supercharger provided with a rotationally driven impeller, a first control means responsive to changes in the differential between a predetermined total pressure and the static pressure in the impeller discharge region of the supercharger, a second control means responsive to changes in the speed of rotation of said supercharger impeller, a valve actuable to control fuel flow to the engine, and mechanism responsive to said first and second control means operable to actuate said valve and meter the fuel flow therethrough in accordance with the ratio of the differential between said total and static pressures to the speed of said second control means.

10. In apparatus for metering fuel flow to an internal combustion engine having associated therewith a supercharger provided with a rotationally driven impeller, means to tap-off from the impeller discharge region of the supercharger a predetermined total pressure and the static pressure therein, speed take-off means associated with said engine arranged to be driven directly proportional to the speed of rotation of the impeller, a first control means responsive to changes in the speed of rotation of said supercharger impeller, a second control means responsive to changes in the differential between said total and static pressures, a valve actuable to control the flow of fuel to the engine, and mechanism responsive to said first and second control means operable to meter the flow of fuel to the engine in accordance with the ratio of the differential between said total and static pressures to the speed of rotation of said speed take-off means.

11. In apparatus for metering the flow of fuel to an internal combustion engine having associated therewith a supercharger provided with a rotationally driven impeller, means to tap-off from the impeller discharge region of the supercharger a predetermined total pressure and the static pressure therein, a first control means actuable in direct proportion to the differential between said total and static pressures, impeller speed take-off means associated with said supercharger and arranged to be driven at the speed of rotation of the impeller, a second control means actuable in direct proportion to the speed of rotation of said impeller, a valve actuable to control the flow of fuel to the engine, and mechanism controlled by actuation of said first and second control means operable to meter fuel flow to the engine in accordance with the ratio of the differential between said total and static pressures to the speed of rotation of the impeller.

12. In apparatus for metering the flow of fuel to an internal combustion engine having associated therewith a supercharger provided with a rotationally driven impeller, first and second control means, means operable to actuate said first control means in accordance with changes in the speed of rotation of said impeller, means operable to position said second control means in accordance with changes in the differential between said pressures, a valve to regulate fuel flow to the engine, and mechanism responsive to a change in the ratio of the second control means to the first control operable to actuate said valve and cause fuel to flow therethrough to the engine in accordance with the ratio of said first to the second control means, the ratio of said first and second control means being in the ratio of said pressure differential to the speed of rotation of the impeller.

13. In apparatus for metering the flow of fuel to an internal combustion engine having associated therewith a supercharger provided with a rotationally driven impeller, means to tap-off from the impeller discharge region of the supercharger a predetermined total pressure and the static pressure therein, speed take-off means associated with said supercharger and arranged to be driven at the speed of rotation of the impeller, first and second control means, means connected to said speed take-off means operable to actuate said first control means in accordance with changes in the speed of rotation of said impeller, means responsive to said total and static pressures operable to position said control means in accordance with changes in the differential between said pressures, a valve to regulate fuel flow to the engine, and mechanism responsive to a change in the ratio of the second control means to the first control operable to actuate said valve and cause fuel to flow therethrough to the engine in accordance with the ratio of said first to the second control means, the ratio of said first and second control means being in the ratio of said pressure differential to the speed of rotation of the impeller.

14. In apparatus for metering the flow of fuel to an internal combustion engine having associated therewith a supercharger provided with a rotationally driven impeller, an electrical bridge circuit including first, second and third variable resistances and a fixed resistance, said resistances being arranged in said circuit so that said third and fixed resistances tend to balance electrically with said first and second resistances, means operable to change the value of said first resistance in accordance with changes in the speed of rotation of the supercharger impeller, means operable to change the value of said second resistance in accordance with changes in the differential between a predetermined total pressure and the static pressure in the supercharger impeller discharge region, means in said circuit responsive to unbalance in said bridge circuit caused by a change in at least one of said first and second resistances operable to change the value of said third resistance proportionally with respect to said fixed resistance according to the ratio of the values of the first and second resistances and thereby rebalance said bridge circuit, and valve means operable by said last mentioned means to meter fuel flow to the engine in accordance with the ratio of the values of said first and second resistances, the values of said first and second resistances being in the ratio of the difference between said supercharger total and static pressures to the speed of rotation of the impeller.

15. In apparatus for metering the flow of fuel to an internal combustion engine having associated therewith a supercharger provided with a rotationally driven impeller, means to tap-off from the impeller discharge region of the supercharger a predetermined total pressure and the static pressure therein speed take-off means associated with said supercharger and arranged to be driven at the speed of rotation of the impeller, an electrical bridge circuit including first, second and third variable resistances and a fixed resistance, said resistances being arranged in said circuit so that said third and fixed resistances tend to balance electrically with said first and second resistances, means connected to said speed take-off means operable to change the value of said first resistance in accordance with changes in the speed of rotation of the supercharger impeller, means responsive to said supercharger total and static pressures operable to change the value of said second resistance in accordance with changes in the differential between said pressures, means in said circuit responsive to unbalance in said bridge circuit caused by a change in at least one of said first and second resistances operable to change the value of said third resistance proportionally with respect to said fixed resistance according to the ratio of the values of the first and second resistances and thereby rebalance said bridge circuit, and valve means operable by said last mentioned means to meter fuel flow to the engine in accordance with the ratio of the values of said first and second resistances, the values of said first and second resistances being in the ratio of the difference between said supercharger total and static pressures to the speed of rotation of the impeller.

16. In a supercharger for internal combustion engines, said supercharger having a rotationally driven impeller, means to tap-off independently from the impeller discharge region of the supercharger a predetermined total pressure and the static pressure therein comprising open ended tubes extending into said supercharger and having their open ends positioned in the impeller discharge region thereof at relatively spaced points circumferentially of the impeller, the plane of the end opening of one of said tubes being disposed substantially parallel to the plane of rotation of said impeller to tap-off the static pressure in said impeller discharge region, and another of said tubes having its open end portion inclined toward said impeller at a predetermined angle to the tangent thereto at that point with its end opening facing generally against the direction of radial discharge from the impeller to tap-off the geometric mean pressure between the resultant and radial components of the total pressure therein.

17. A supercharger for internal combustion engines comprising a casing, an impeller rotatably mounted in said casing, said casing defining circumferentially and radially of said impeller an impeller discharge region, an open ended tube extending inwardly of said casing into said supercharger impeller discharge region with its end opening disposed in a plane substantially parallel to the plane of rotation of said impeller to tap-off the static pressure in said impeller discharge region, and at least one other open ended tube extending inwardly of said casing into said impeller discharge region at a point relatively spaced circumferentially with respect to the first named tube, said other tube having its open end portion inclined toward said impeller at a predetermined angle to the tangent thereto at that point with its end opening facing against the direction of radial discharge from the impeller to tap-off the geometric mean pressure between the resultant and radial components of the total pressure therein.

18. A supercharger for internal combustion engines comprising a casing, an impeller rotatably mounted in said casing, a discharge diffuser in said casing extending circumferentially of said impeller, an open ended tube extending inwardly of said casing intermediate said impeller and diffuser with its end opening disposed in a plane parallel to the plane of rotation of said impeller to tap-off the static pressure in said impeller discharge region, and at least one other open ended tube extending inwardly of said casing intermediate said impeller and diffuser at a point relatively spaced circumferentially thereof with respect to the first named tube, said other tube having its open end portion inclined toward the impeller at a predetermined angle to the tangent to said impeller at that point with its end opening facing against the direction of radial discharge from said impeller to tap-off the geometric mean pressure between the resultant and radial components of the total pressure therein.

DANIEL G. RUSS.

REFERENCES CITED

The following references are of record in the file of this patent:

UNITED STATES PATENTS

| Number | Name | Date |
|---|---|---|
| 1,826,762 | Franklin | Oct. 13, 1931 |
| 1,897,858 | Peck | Feb. 14, 1933 |
| 2,324,599 | Schorn | July 20, 1943 |
| 2,343,451 | Garretson | Mar. 7, 1944 |
| 2,374,130 | Planiol | Apr. 17, 1945 |

FOREIGN PATENTS

| Number | Country | Date |
|---|---|---|
| 523,895 | England | July 25, 1940 |